United States Patent
Hall et al.

[11] Patent Number: 6,082,966
[45] Date of Patent: Jul. 4, 2000

[54] STATOR VANE ASSEMBLY FOR A TURBOMACHINE

[75] Inventors: John Hall; Simon J Gallimore, both of Derby, United Kingdom

[73] Assignee: Rolls-Royce plc, London, United Kingdom

[21] Appl. No.: 09/256,287

[22] Filed: Feb. 24, 1999

[30] Foreign Application Priority Data

Mar. 11, 1998 [GB] United Kingdom .................. 9805030

[51] Int. Cl.$^7$ .......................................... F01D 9/00
[52] U.S. Cl. ............................ 415/209.1; 415/208.2; 415/208.3; 415/208.5; 415/210.1
[58] Field of Search ..................... 415/208.2, 209.1, 415/208.3, 208.5, 210.1

[56] References Cited

U.S. PATENT DOCUMENTS

| | | |
|---|---|---|
| 4,793,770 | 12/1988 | Schonewald et al. .................. 415/190 |
| 5,207,054 | 5/1993 | Rodgers . | |

FOREIGN PATENT DOCUMENTS

| | | |
|---|---|---|
| 0164539 | 12/1985 | European Pat. Off. . |
| 0343888 | 11/1989 | European Pat. Off. . |
| 1291235 | 10/1972 | United Kingdom . |
| 2004329 | 3/1979 | United Kingdom . |
| 2046849 | 11/1980 | United Kingdom . |
| 2226600 | 7/1990 | United Kingdom . |
| WO 93/0141 | 1/1993 | WIPO . |

Primary Examiner—Edward K. Look
Assistant Examiner—Ninh Nguyen
Attorney, Agent, or Firm—W. Warren Taltavull; Farkas & Manelli PLLC

[57] ABSTRACT

A stator vane assembly for a gas turbine engine (10) compressor (16) comprises a plurality of circumferentially arranged stator vanes (44A) and a plurality of circumferentially arranged load bearing struts (46). The leading edges (45,47) of the stator vanes (44A) and the struts (46) are arranged in a common plane. The leading edges (45,47) of the stator vanes (44A) and the struts (46) have substantially the same profile. The spacing (B) between adjacent struts (44A) in any group is the same. The spacing (C) between the suction surface (50) of one of the struts (46A) of the adjacent pair of struts (46) and an adjacent stator vane (44A) is less than the spacing (B) between adjacent stator vanes (44A) and the spacing (D) between the pressure surface (52) of the other of the struts (46B) of the adjacent pair of struts (46) and an adjacent stator vane (44A) is greater than the spacing (B) between adjacent stator vanes (44A) to equalise aerodynamic loading of the stator vanes (44A) and to reduce the aerodynamic losses of the struts (46).

12 Claims, 4 Drawing Sheets

STATOR VANE ASSEMBLY FOR A TURBOMACHINE

The present invention relates generally to a stator vane assembly for a turbomachine, particularly to a stator vane assembly for a gas turbine engine.

It is frequently a requirement to pass loads through struts or stator vanes which extend across a flow passage through the turbomachine. In the case of a gas turbine engine, struts extend across a fan duct to interconnect a fan casing and a core engine casing to carry loads and fan outlet stator vanes direct the airflow through the fan duct. Additionally in the case of a gas turbine engine, struts or stator vanes extend across a compressor outlet to interconnect the casing and bearings and outlet stator vanes direct the airflow to a combustion chamber assembly. In the latter case if the outlet stator vanes carry the loads, the outlet stator vanes have to be made stronger to carry the loads which results in an increase in the thickness of the aerofoil cross-section and this results in greater aerodynamic losses. Alternatively if struts carry the loads, the struts are positioned downstream of the stator vanes usually in the diffuser and this results in overall arrangement of stator vanes and struts that is longer than that required for aerodynamic purposes and this results in an increase in the length, weight and cost of the gas turbine engine.

It is known from UK patent No. GB1291235 to provide a turbomachine with a plurality of circumferentially arranged stator vanes and a plurality of circumferentially arranged load bearing struts, the stator vanes being arranged in groups between adjacent pairs of struts and the leading edges of the stator vanes being arranged in a helical path.

Unfortunately the use of stator vanes arranged in a helical path and therefore this may result in the stator vanes being in the diffuser or may require an increase in length, weight and cost to accommodate the stator vanes arranged in the helical path.

It is known from UK patent application No. GB2046849A to provide a turbomachine with a plurality of circumferentially arranged stator vanes upstream of a strut, the leading edges of the stator vanes being arranged in a common plane and the leading edge of the strut has an asymmetric shape.

Unfortunately the use of struts arranged downstream of the stator vanes and therefore this may result in length, weight and cost to accommodate the struts.

Accordingly the present invention seeks to provide a stator vane assembly for a turbomachine which reduces or overcomes the above mentioned problems.

Accordingly the present invention provides a stator vane assembly for a turbomachine comprising a plurality of circumferentially arranged stator vanes and a plurality of circumferentially arranged load bearing struts, each stator having a leading edge, a trailing edge and a chord length, each strut having a leading edge, a trailing edge, a pressure surface, a suction surface and a chord length, the chord length of the struts being greater than the chord length of the stator vanes, the stator vanes being arranged in groups between adjacent pairs, of struts, each group of stator vanes comprising a plurality of stator vanes the circumferential spacing between adjacent stator vanes in a group being substantially the same, the circumferentoial spacing between the suction surface of one of the struts of an adjacent pair of struts and an adjacent stator vane being less than the circumferential spacing between adjacent stator vanes in the group and the circumferential spacing between the pressure surface of the other of the struts of the adjacent pair of struts and an adjacent stator vane being greater than the circumferential spacing between adjacent stator vanes in the group to equalise aerodynamic loading of the stator vanes and to reduce the aerodynamic losses of the struts.

Preferably the leading edges of the stator vanes and the leading edge of the struts are arranged substantially in a common plane.

Preferably each strut comprises an upstream portion and a downstream portion, the stator vanes and the upstream portions of the struts have substantially the same profile.

Preferably the circumferential spacing between the suction surface of one of the struts of the adjacent pair of struts and an adjacent stator vane being approximately 60% of the circumferential spacing between adjacent stator vanes and the circumferential spacing between the pressure surface of the other of the struts of the adjacent pair of struts and an adjacent stator vane being approximately 140% of the circumferential spacing between adjacent stator vanes.

Preferably the turbomachine is a gas turbine engine, the gas turbine engine comprising a compressor, a combustion chamber assembly and a turbine. Preferably the stator vanes are compressor stator vanes of the gas turbine engine. Preferably the stator vanes are compressor outlet guides vanes arranged to supply air to the combustion chamber assembly of the gas turbine engine. The gas turbine engine comprises a fan arranged within a fan duct defined at least in part by a fan casing, the fan casing being supported by fan outlet guide vanes, the stator vanes may be fan outlet guide vanes arranged to supply air to a fan duct nozzle.

The downstream portions of the struts may be wedge shaped in cross-section.

The leading edges of the stator vanes may be arranged downstream of a plane joining the leading edges of the struts. The trailing edges of the stator vanes may be arranged upstream of a plane joining the trailing edges of the struts.

The present invention will be more fully described by way of example with reference to the accompanying drawing, in which.

Figure 1:
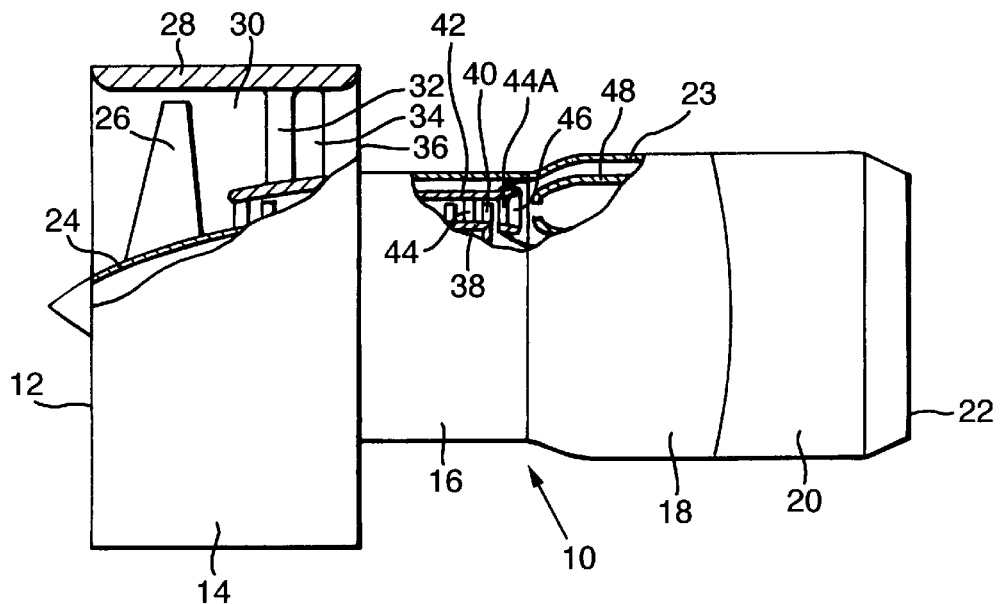
FIG. 1 is a partially cut-away view of a turbofan gas turbine engine having a stator vane assembly according to the present invention.

A turbofan gas turbine engine 10, shown in FIG. 1, comprises in flow series an inlet 12, a fan section 14, a compressor section 16, a combustion section 18, a turbine section 20 and an exhaust nozzle 22.

The fan section 14 comprises a fan rotor 24 which carries a plurality of fan blades 26 and a fan casing 28 which encloses the fan blades 26 and define at least partially a fan duct 30. A plurality of outlet stator vanes 32 extending between the fan casing 28 and a core casing 23 direct the air flow through the fan duct 30 to the fan duct outlet 36 and a plurality of struts 34 extending between the fan casing 28 and the core casing 23 transmit loads between the fan casing 30 and the core casing 23, generally the struts 34 support the fan casing 30 from the core casing 23.

Figure 2:
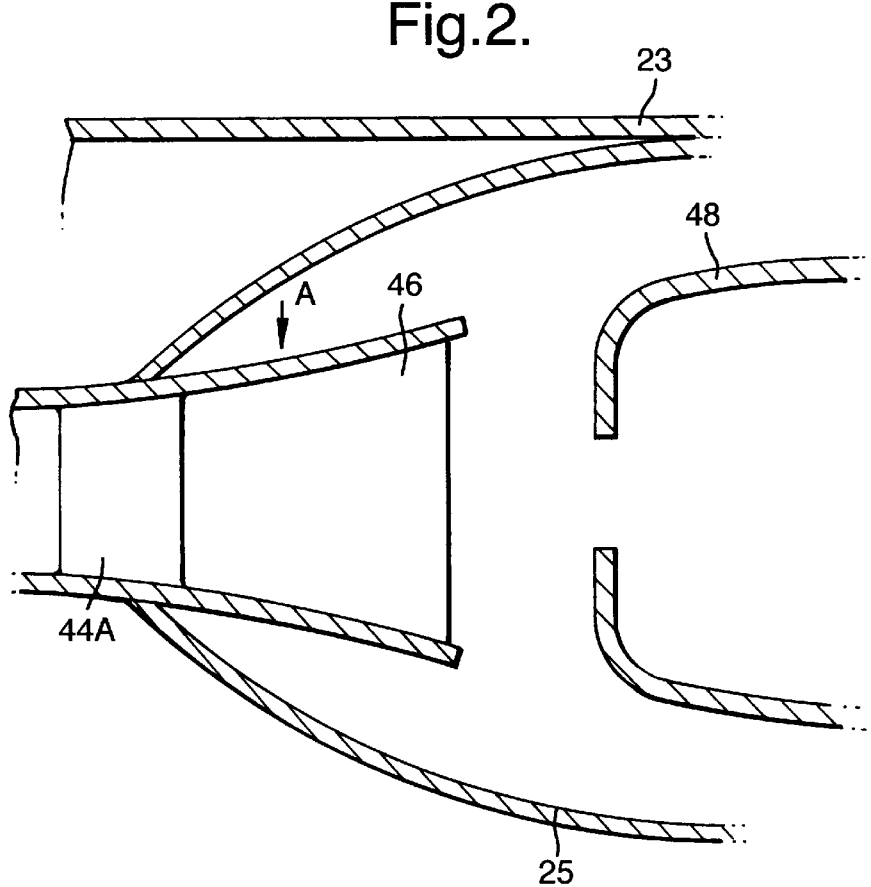
FIG. 2 is an enlarged view of one embodiment of a stator vane assembly according to the present invention as shown in FIG. 1.

The compressor section 16, as shown in FIGS. 1 and 2, comprises a compressor rotor 38 which carries a plurality of stages of compressor rotor blades 40 and a stator structure 42 which carries a plurality of stages of stator vanes 44. The downstream stage of stator vanes, the compressor outlet stator or vanes 44A, directs the air to one or more combustion chambers 48 in the combustion section 18. A plurality of struts 46 are provided to transmit loads between the stator structure 42 including core casing 23 and an inner casing 25.

The turbine section comprises a plurality of turbines (not shown) arranged to drive the compressor rotor 38 and the fan rotor 24 via separate shafts (not shown).

The turbofan gas turbine engine operates quite conventionally in that air flows into the intake 12 and is initially compressed by the fan blades 26. The air flow is split into two portions downstream of the fan blades 26. A first portion of air flows between the fan outlet stator vanes 32 and through the fan duct nozzle 36 to provide the majority of the thrust, in the case of an aircraft mounted gas turbine engine. A second portion of air flows into the compressor section 16 and is compressed before flowing into the combustion section 18. Fuel is injected into the combustion section 18 and is burnt in the air to produce hot gases which flows through and drives the turbines in the turbine section 20. The hot gases finally leave the gas turbine engine through the exhaust nozzle 22 to provide some additional thrust.

Figure 3:
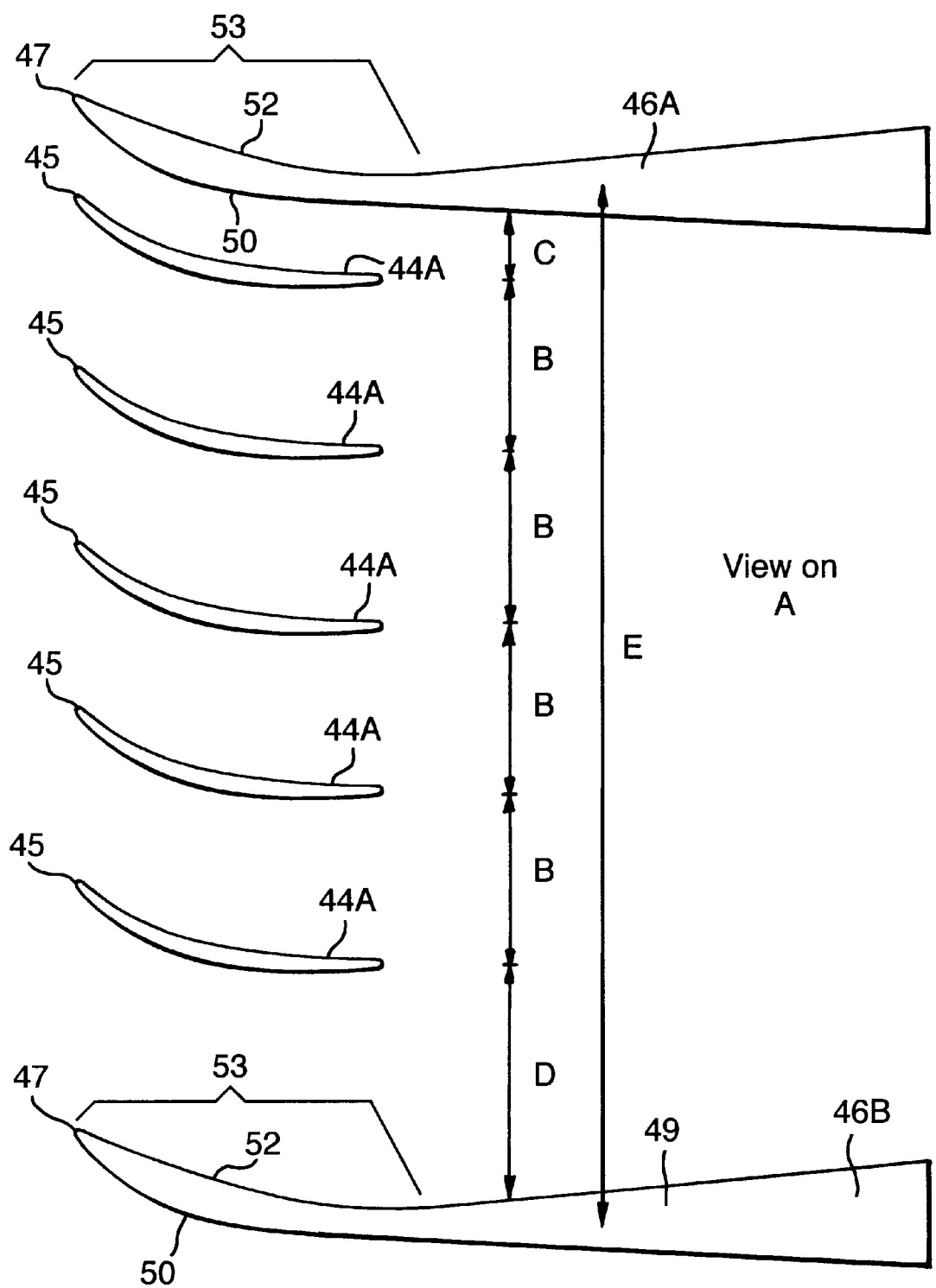
FIG. 3 is an enlarged view in the direction of arrow A in FIG. 2.

The downstream stage of stator vanes, the compressor outlet stator vanes 44A, shown more clearly in FIGS. 2 and 3, comprises a plurality of circumferentially arranged stator vanes 44A and a plurality of circumferentially arranged struts 46 are interspersed with the stator vanes 44A.

More particularly as seen in FIG. 3 the stator vanes 44A are arranged in groups between adjacent pairs of struts 46. The leading edges 45 of the stator vanes 44A and the leading edges 47 of the struts 46 are arranged substantially in a common plane perpendicular to the engine axis. Each strut 46 comprises an upstream portion 53 and a downstream portion 49. The stator vanes 44A and the upstream portions 53 of the struts 46 have substantially the same profile. Thus the upstream portions 53 of the struts 46 produce turning of the air flow similar to that produced by the stator vanes 44A.

The circumferential spacing E between each pair of adjacent struts 46A is the same. The circumferential spacing B between adjacent vanes 44A in any group is substantially the same. The circumferential spacing C between the suction surface 50 of one of the struts 46A of the adjacent pair of struts 46 and an adjacent stator vane 44A is less than the circumferential spacing B between adjacent stator vanes 44A. Also the circumferential spacing D between the pressure surface 52 of the other of the struts 46B of the adjacent pair of struts 46 and an adjacent stator vane 44A is greater than the circumferential spacing B between adjacent stator vanes 44A to equalise aerodynamic loading of the stator vanes 44A and to reduce the aerodynamic losses of the struts 46.

The upstream portions 53 of the struts 46 blend into wedge shaped profiled downstream portions 49 towards the downstream ends of the struts 46.

It is to be noted that the leading edges 45 of the stator vanes 44A are in the same plane, or downstream of the plane joining the leading edges 47 of the struts 46 and that the trailing edges of the stator vanes 44 are upstream of the plane joining the trailing edges of the struts 46. It is also to be noted that the wedge shaped profiled downstream portions 49 of the struts 46 are downstream of the trailing edges of the stator vanes 44A. The struts 46 have a greater chord length, or axial length, than the stator vanes 44A. Thus it is seen that the whole chord length, or axial length, of the stator vanes 44A is arranged between the leading edges 47 of the struts 46 and the trailing edges of the struts 46.

In a particular example there are five stator vanes 44A in each group of stator vanes 44A between adjacent pairs of struts 46, and the circumferential spacing C between the suction surface 50 of one of the struts 46A of the adjacent pair of struts 46 and an adjacent stator vane 44A is approximately 60% of the circumferential spacing B between adjacent stator vanes 44A and the circumferential spacing D between the pressure surface 52 of the other of the struts 46B of the adjacent pair of struts 46 and an adjacent stator vane 44A is approximately 140% of the circumferential spacing B between adjacent stator vanes 44A.

Figure 4:
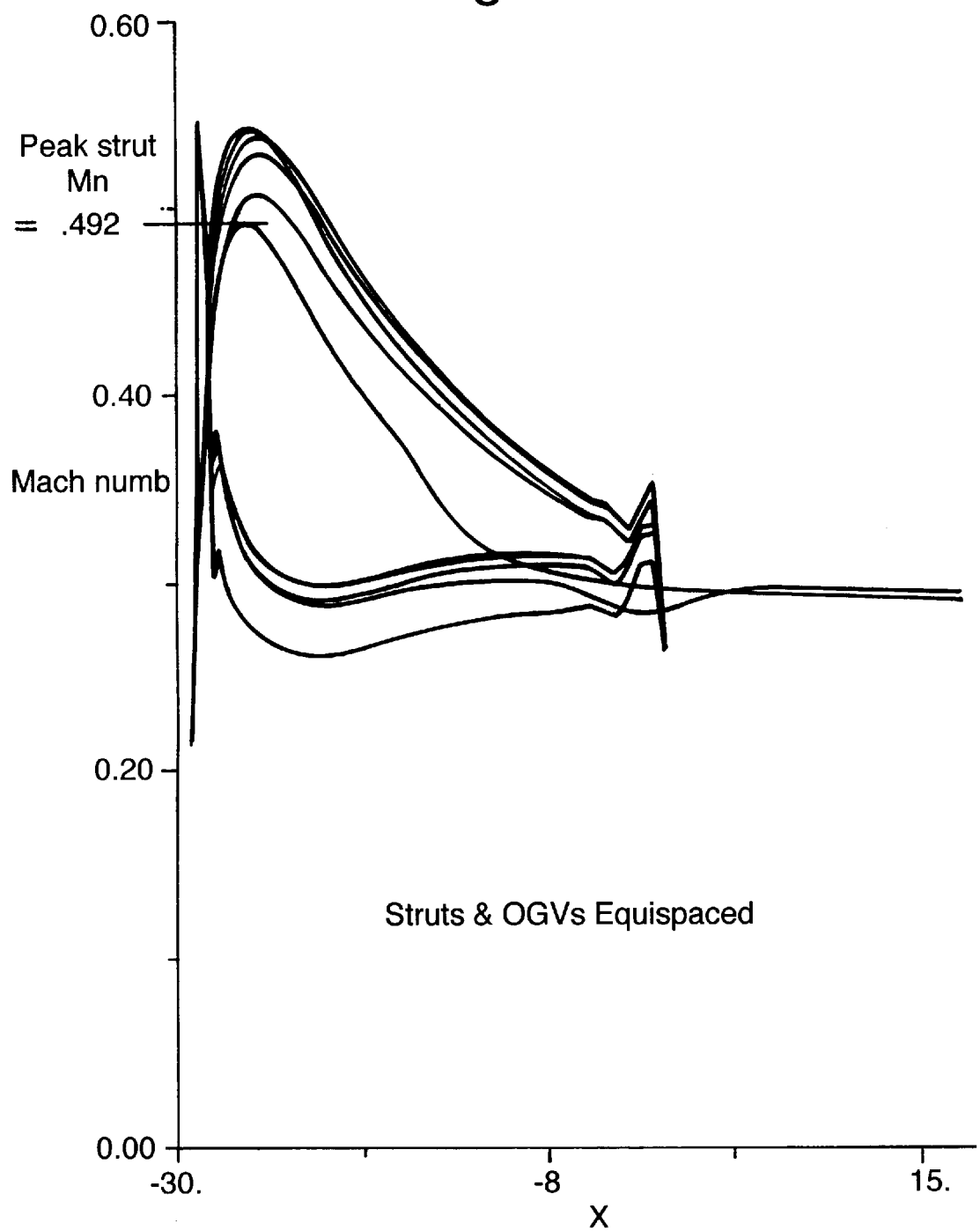
FIG. 4 is a graph of Mach no. against axial distance along a stator vane for a prior art stator vane assembly.
Figure 5:
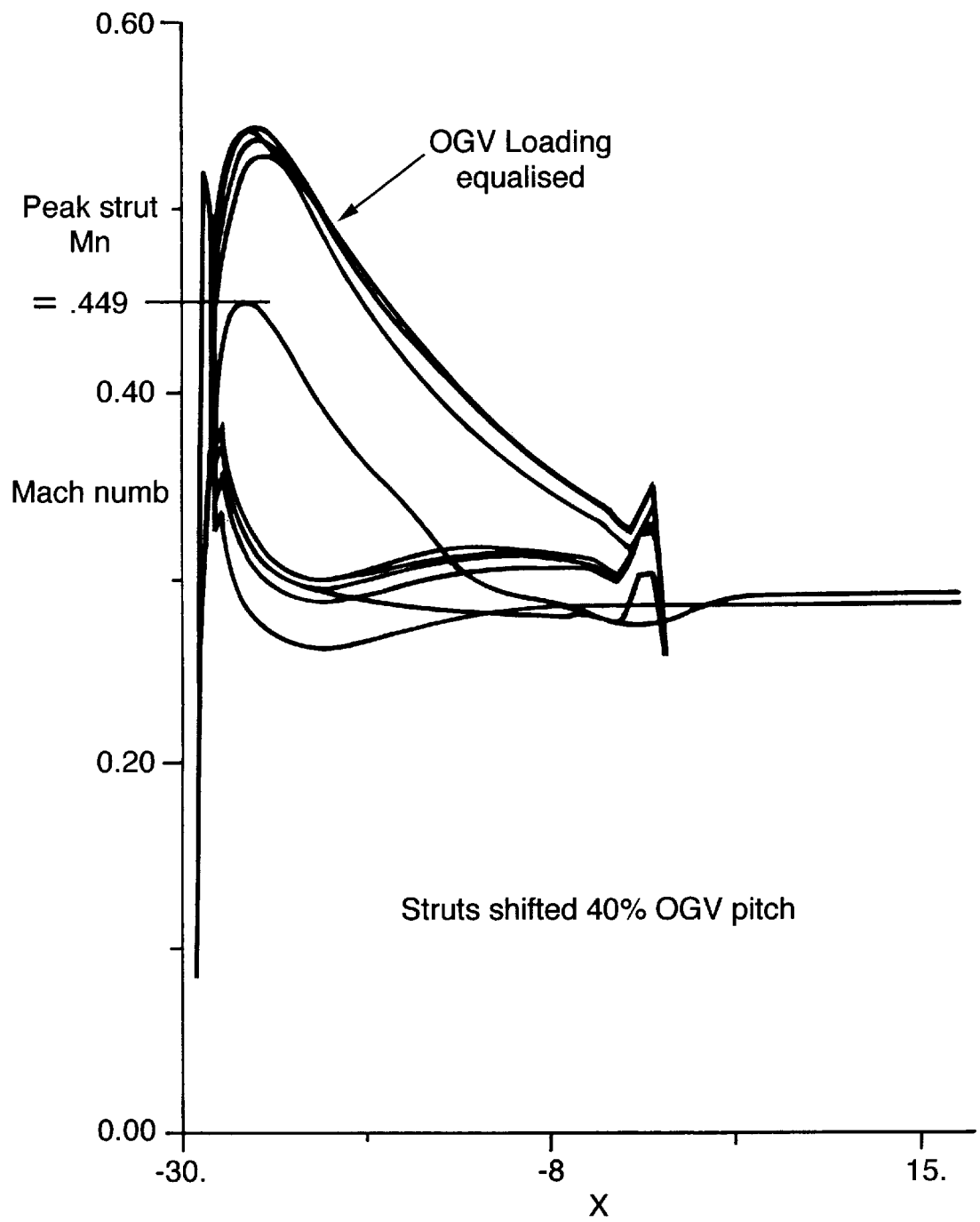
FIG. 5 is a graph of Mach no. against axial distance along a stator vane for a stator vane assembly according to the present invention.

The non-uniform circumferential spacing C and D between the struts 46 and the adjacent stator vanes 44A equalises the aerodynamic loading on the stator vanes 44A and aerodynamically off loads the struts 46 to reduce the losses produced by the struts 46. The non-uniform circumferential spacing C and D between the struts 46 and the adjacent stator vanes 44A reduces the aerodynamic losses relative to an arrangement with the same circumferential spacing between the struts and the adjacent stator vanes as between adjacent stator vanes, and FIGS. 4 and 5 compare the Mach no for these two arrangements. It can be seen from FIG. 4 and 5 that the Mach nos. for the stator vanes 44A are more equal in FIG. 5 and that the peak strut Mach no. for the struts is less in FIG. 5.

The aerodynamic loading on the struts 46 is reduced by reducing the passage area, by reducing the circumferential spacing C between the strut 46 and the adjacent stator vane 44A, and hence the air mass flow through the passage is reduced. The increased curvature, and acceleration of the air flow, around the upstream portions 53 of the struts 46 is compensated by the reduced flow through the passage. The reduced aerodynamic loading on the struts 46 means that there is reduced diffusion and loss along the suction surface 50 of the strut 46. The secondary flows and secondary losses are also reduced by the reduced aerodynamic loading of the struts 46.

The aerodynamic loads on the stator vanes 44A are equalised allowing the same aerofoils to be used and minimum aerodynamic losses to be achieved. The struts 46 have greater thickness than the stator vanes 44A to carry the leads.

The advantage of the invention is that it enables the non load bearing stator vanes 44A to be made thin and to be aerodynamically optimised to turn the air flow with minimum losses. The struts 46 take all the mechanical loads and contribute to the turning of the air flow by having an aerodynamic upstream portions 53 of the same shape as the stator vanes 44A. The aerodynamic losses of the struts 46 are minimised by off loading due to the non-uniform circumferential spacing between the struts 46 and the adjacent stator vanes 44A.

The invention is also applicable to the fan outlet stator vanes 32 and struts 34 of a turbofan gas turbine engine, as shown in FIG. 1. The invention is also applicable to other positions in a gas turbine engine requiring stator vanes and struts to be incorporated in a minimum axial length, the invention is also applicable to other turbomachines for example steam turbines etc.

We claim:

1. A stator vane assembly for a turbomachine comprising a plurality of circumferentially arranged stator vanes and a plurality of circumferentially arranged load bearing struts, each stator vane having a leading edge, a trailing edge and a chord length, each strut having a leading edge, a trailing edge, a pressure surface, a suction surface and a chord length, the chord length of the struts being greater than the chord length of the stator vanes, the stator vanes being arranged in groups between adjacent pairs of struts, each group of stator vanes comprising a plurality of stator vanes, the circumferential spacing between adjacent stator vanes in a group being substantially the same, the circumferential spacing between adjacent struts being substantially the same, the circumferential spacing between the suction surface of one of the struts of an adjacent pair of struts and an adjacent stator vane being less than the circumferential spacing between adjacent stator vanes in the group and the circumferential spacing between the pressure surface of the other of the struts of the adjacent pair of struts and an adjacent stator vane being greater than the circumferential spacing between adjacent stator vanes in the group to equalise aerodynamic loading of the stator vanes and to reduce the aerodynamic losses of the struts.

2. A stator vane assembly as claimed in claim 1 wherein the leading edges of the stator vanes and the leading edge of the struts are arranged substantially in a common plane.

3. A stator vane assembly as claimed in claim 1 or claim 2 wherein each strut comprising an upstream portion and a downstream portion, the stator vanes and the upstream portions of the struts have substantially the same profile.

4. A stator vane assembly as claimed in claim 1 wherein the circumferential spacing between the suction surface of one of the struts of the adjacent pair of struts and an adjacent stator vane being approximately 60% of the circumferential spacing between adjacent stator vanes and the circumferential spacing between the pressure surface of the other of the struts of the adjacent pair of struts and an adjacent stator vane being approximately 140% of the circumferential spacing between adjacent stator vanes.

5. A stator vane assembly as claimed in claim 1 wherein the turbomachine is a gas turbine engine, the gas turbine engine comprising a compressor, a combustion chamber assembly and a turbine.

6. A stator vane assembly as claimed in claim 5 wherein the stator vanes are compressor stator vanes of the gas turbine engine.

7. A stator vane assembly as claimed in claim 6 wherein the stator vanes are compressor outlet guides vanes arranged to supply air to the combustion chamber assembly of the gas turbine engine.

8. A stator vane assembly as claimed in claim 5 wherein the gas turbine engine comprises a fan arranged within a fan duct defined at least in part by a fan casing, the fan casing being supported by fan outlet guide vanes, the stator vanes are fan outlet guide vanes arranged to supply air to a fan duct nozzle.

9. A stator vane assembly as claimed in claim 2 wherein the downstream portions of the struts are wedge shaped in cross-section.

10. A stator vane assembly as claimed in claim 1 wherein the leading edges of the stator vanes are arranged downstream of a plane joining the leading edges of the struts.

11. A stator vane assembly as claimed in claim 1 wherein the trailing edges of the stator vanes are arranged upstream of a plane joining the trailing edges of the struts.

12. A stator vane assembly for a turbomachine comprising a plurality of circumferentially arranged stator vanes and a plurality of circumferentially arranged load bearing struts, each stator vane comprising a leading edge, a trailing edge and a chord length, each strut having a leading edge, a trailing edge, a pressure surface, a suction surface and a chord length, the chord length of the struts being greater than the chord lengths of the stator vanes, each strut comprises an upstream portion and a downstream portion, the stator vanes and the upstream portions of the struts having substantially the same profile, the downstream portions of the struts are wedge shaped in cross-section, the stator vanes being arranged in groups between adjacent pairs of struts, each group of stator vanes comprising a plurality of stator vanes, the circumferential spacing between adjacent stator vanes in a group being substantially the same, the circumferential spacing between adjacent struts being substantially the same, the circumferential spacing between the suction surface of one of the struts of an adjacent pair of struts and an adjacent stator vane being less than the circumferential spacing between adjacent stator vanes in the group and the circumferential spacing between the pressure surface of the other of the struts of the adjacent pair of struts and an adjacent stator vane being greater than the circumferential spacing between adjacent stator vanes in the group to equalise aerodynamic loading of the stator vanes and to reduce the aerodynamic losses of the struts.

* * * * *